(12) United States Patent
Frankland (10) Patent No.: US 11,641,130 B2
(45) Date of Patent: May 2, 2023

(54) CONVERTER UNIT USING A STATUS LAMP

(71) Applicant: Tridonic GmbH & Co KG, Dornbirn (AT)

(72) Inventor: James Frankland, Darlington (GB)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 17/785,093

(22) PCT Filed: Dec. 16, 2020

(86) PCT No.: PCT/EP2020/086573
§ 371 (c)(1),
(2) Date: Jun. 14, 2022

(87) PCT Pub. No.: WO2021/139989
PCT Pub. Date: Jul. 15, 2021

(65) Prior Publication Data
US 2023/0022449 A1    Jan. 26, 2023

(30) Foreign Application Priority Data

Jan. 7, 2020 (EP) .................................. 20150413

(51) Int. Cl.
*H02J 9/02* (2006.01)
*H02J 9/06* (2006.01)
(Continued)

(52) U.S. Cl.
CPC .............. *H02J 9/02* (2013.01); *H02J 7/0047* (2013.01); *H02J 7/0068* (2013.01); *H02J 9/065* (2013.01);
(Continued)

(58) Field of Classification Search
CPC .......... H02J 9/02; H02J 7/0047; H02J 7/0068; H02J 9/065; H05B 47/105; F21Y 2115/10
See application file for complete search history.

(56) References Cited

U.S. PATENT DOCUMENTS 9,048,685 B2 * 6/2015 Huang .................... H02J 9/065
9,357,617 B2 * 5/2016 Ray ........................ H05B 47/10

FOREIGN PATENT DOCUMENTS

WO    2018/158192 A1    9/2018

OTHER PUBLICATIONS

PCT/EP2020/086573, International Search Report and Written Opinion dated Feb. 15, 2021, 11 pages.

* cited by examiner

*Primary Examiner* — Carlos Amaya
(74) *Attorney, Agent, or Firm* — Andrus Intellectual Property Law, LLP

(57) ABSTRACT

The present invention relates to a converter unit for providing a supply current to a load device (2) using an energy storage device (6). The converter unit (1) comprises a controlling means (7) configured to set at least one charging parameter and/or a charging mode and to control charging of the energy storage device (6) based on the set charging parameter and/or the set charging mode; and at least a first terminal (S1), a second terminal (S2) and a third terminal (S3) for electrically connecting a two-pole status indicator light (8), wherein the controlling means (7) is configured to detect to which of the first terminal (S1), the second terminal (S2) and the third terminal (S3) the two-pole status indicator light (8) is connected and is configured to set the at least one charging parameter and/or the charging mode based on the detection result.

10 Claims, 5 Drawing Sheets

(51) Int. Cl.
*H02J 7/00* (2006.01)
*H05B 47/105* (2020.01)
*F21Y 115/10* (2016.01)
(52) U.S. Cl.
CPC ........ *H05B 47/105* (2020.01); *F21Y 2115/10* (2016.08)

CONVERTER UNIT USING A STATUS LAMP

CROSS REFERENCE TO RELATED APPLICATIONS

The present application is the U.S. national stage application of international application PCT/EP2020/086573 filed Dec. 16, 2020, which international application was published on Jul. 15, 2021 as International Publication WO 2021/139989 A1. The international application claims priority to European Patent Application No. 20150413.1 filed Jan. 7, 2020.

TECHNICAL FIELD OF THE INVENTION

The invention is in the field of converters, especially for emergency lighting, for supplying a load current. The invention provides a converter unit having an interface for selecting charging parameter and/or charging mode for the energy storage device of an emergency lighting device.

BACKGROUND OF THE INVENTION

In emergency lighting systems, emergency converters, sometimes also referred as converters, ballasts or driver devices, are used for providing a supply current to an emergency lighting device for a predetermined time in case mains supply fails. The current supply is maintained or activated in case of a mains supply failure for a rated service time using energy stored in an energy storage device such as a rechargeable battery. The rated service time defines a battery discharge duration during which the emergency converter unit is required to drive the emergency light with a predetermined drive current. This predetermined drive current is a minimum load current enabling the connected lamp to fulfil their task of providing an emergency light level for the rated service time.

In many systems, the functionality of the emergency light system has to be tested at predefined intervals by performing functional tests, and the functionality has to be continuously monitored during operation of the emergency device using built-in test equipment. After conducting such a test or after the device encountered a power failure, the energy storage device must be recharged.

The charging parameters (charge current and/or voltage) and the charging mode including a charging voltage- and/or current-characteristic depend on the type of the energy storage device and sometimes on an operating condition. Usually, NiCd batteries are charged with constant current whereas NiMh batteries benefit from a pulse charge.

In order to cover different types of batteries and applications, the converter unit can be designed to charge using different charging parameters and/or charging modes, wherein the charging parameter and/or mode is selected by the user by operating jumper switches or DIP switches built in the converter unit or connected to the converter unit via terminals of an interface.

However, extra switches and terminals increase the overall costs of the converter unit and involve considerable space at a housing assembly of the emergency converter unit device.

SUMMARY OF THE INVENTION

It is an object of the present invention to overcome the above-mentioned drawbacks and to provide an improved converter unit for universal use. More specifically, it is an object of the invention to provide a converter, an emergency light and a method for setting at least one charging parameter and/or a charging mode of an emergency converter unit device, with which configuration of the charge process can easily be performed and with which the costs and complexity of a converter/emergency light can be reduced.

This object is achieved by an emergency converter unit device, an emergency light and a method according to the enclosed independent claims. Advantageous features of the present invention are defined in the corresponding dependent claims.

According to the present invention, the converter unit for providing a supply current to a load device using an energy storage device comprises a controlling means configured to set at least one charging parameter and/or a charging mode for charging the energy storage device and to control charging of the energy storage device based on the set charging parameter and/or the set charging mode and at least a first terminal, a second terminal and a third terminal for electrically connecting a two-pole status indicator light, wherein the controlling means is configured to detect to which of the first terminal, the second terminal and the third terminal the two-pole status indicator light is connected and to set the at least one charging parameter and/or the charging mode based on the detection result.

The two-pole status indicator light can at least indicate function test, power failure (emergency light mode), maintained or non-maintained operation, charge process and/or malfunction of the emergency converter unit device.

With the present invention, the charging parameter and/or the charging mode can be selected by connecting the indicator light to two of three terminals like a jumper. In this way, even if terminals for an indicator light are already provided, no additional terminals or switches for selecting the charging parameter and/or the charging mode are needed.

In order to increase the connection options and the number of selectable charging parameters and/or charging modes, the converter unit can comprise more than three terminals for connecting the two-pole status indicator light, wherein the controlling means is configured to differentiate between at least two connection options for connecting the two-pole status indicator light to the terminals and is configured to set the at least one charging parameter and/or the charging mode based on an assignment such as a table that assigns a predetermined charging parameter and/or a predetermined charging mode to each of the two connection options.

Alternatively or in addition, the number of selectable charging parameters and/or charging modes can be increased by using a light emitting diode as the two-pole status indicator light, wherein the controlling means is configured to detect a polarity of the connected light emitting diode and to set the at least one charging parameter and/or the charging mode also based on the detected polarity.

The at least three terminals need not only be terminals for connecting the two-pole status indicator light but can also be terminals for connecting one or more switches operable by the user. The switches can be connected to unoccupied terminals or in parallel to an occupied terminal and an unoccupied terminal. Alternatively or in addition, switch with normally open contact can be connected in parallel to the two-pole status indicator light. In a preferred embodiment of the emergency converter unit device, at least one switch is connected in parallel to the terminals and the controlling means is configured to detect whether a short circuit is applied between the first terminal and the second terminal, between the first terminal and the third terminal and/or between the second terminal and the third terminal.

In addition, the controlling means can be configured to start a test mode, to switch between maintained mode and non-maintained mode, to switch between a first battery discharge duration and a second battery discharge duration, or to start a charging process of the energy storage device, when the short circuit is applied.

Alternatively, switches for setting the battery discharge duration can be connected to the terminals, wherein the controlling means can be configured to detect whether a first short circuit is applied between the first terminal and the second terminal, whether a second short circuit is applied between the first terminal and the third terminal and whether a third short circuit is applied between the second terminal and the third terminal, and to set a first battery discharge duration, when the first short circuit is applied, to set a second battery discharge duration, when the second short circuit is applied and to set a third battery discharge duration, when the third short circuit is applied. The battery discharge duration is the time during which the emergency converter unit is required to drive the emergency light with a predetermined drive current.

The at least one charging parameter can be a value of a charging current.

Alternatively or in addition, the controlling means can be configured to set at least one of constant charging and pulse charging as the charging mode.

According to the present invention, an emergency light comprises the two-pole status indicator light, a converter unit as described above and a lamp as said load device.

According to the present invention, a method for setting at least one charging parameter and/or a charging mode of a converter unit as described above comprises steps of:

detecting to which of the two poles of the three-pole interface (9) the two-pole status indicator light (10) is connected; and setting the at least one charging parameter and/or the charging mode based on the detection result.

BRIEF DESCRIPTION OF THE DRAWINGS

The invention will now be explained in more detail with reference to the accompanying drawings, wherein.

The same features are denoted by the same reference signs throughout all figures.

DETAILED DESCRIPTION OF THE PREFERRED EMBODIMENTS

Figure 1:
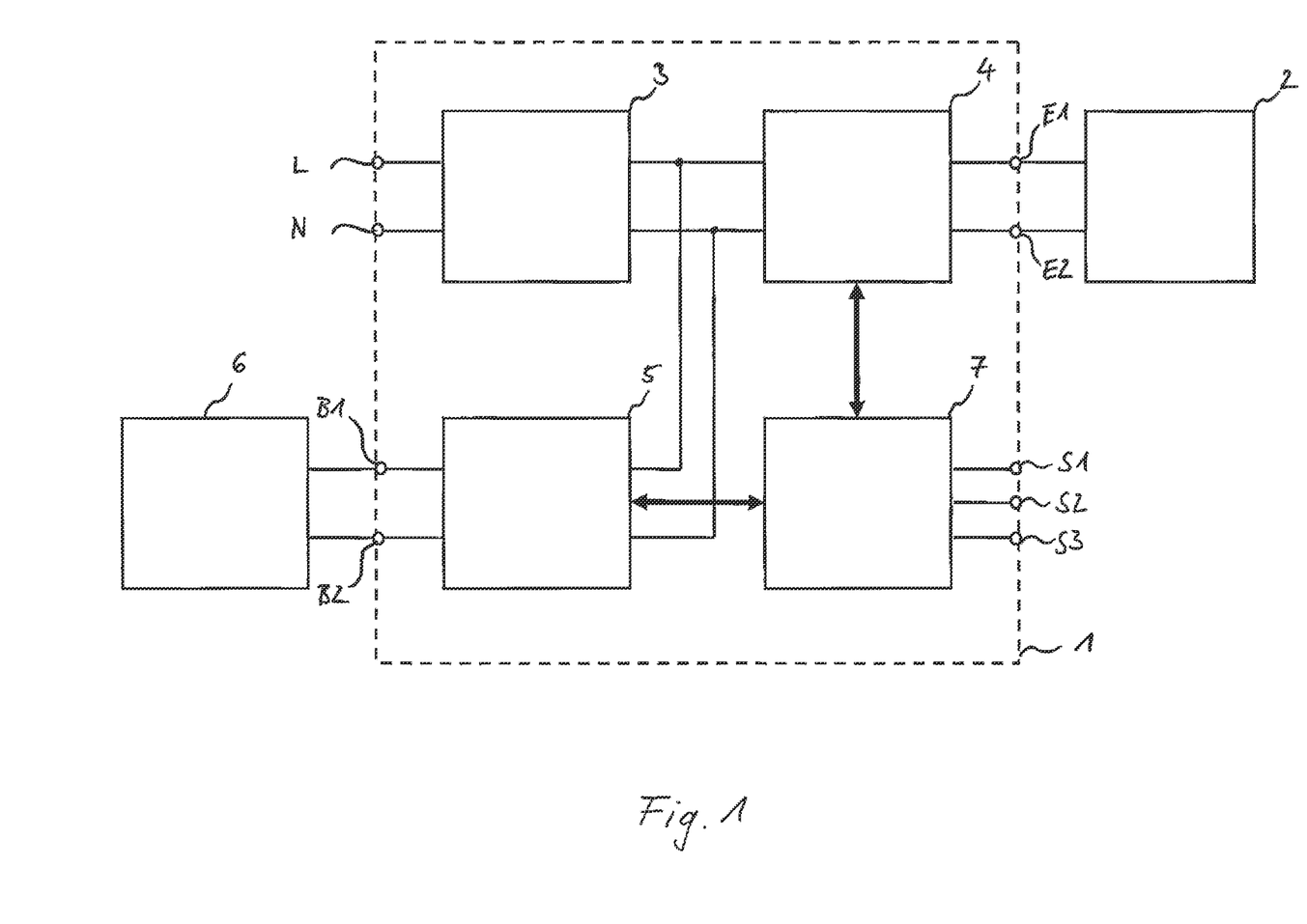
FIG. 1 shows a converter unit according to an embodiment of the present invention.

FIG. 1 shows a converter unit 1 according to a first embodiment of the present invention, which can be a part of an emergency luminaire for anti-panic lighting or escape route lighting. The converter unit 1 shown in FIG. 1 is represented in a simplified manner and comprises input terminals L, N for being supplied with an AC voltage, output terminals E1, E2 to which a illuminant 2 is connected, a rectifier 3 for rectifying the AC voltage, a DC/DC converter unit 4 for converting DC voltage output by the rectifier 3 into a working voltage for the illuminant 2, a charging unit 5 for charging a rechargeable battery 6 (energy storage device) connected to terminals B1, B2, terminals S1 . . . S3 (interface) for connecting a status indicator light (not shown) and a controlling means 7 for controlling the DC/DC converter 4 and the charging unit 5.

The controlling means 7 may contain one or more microcontroller circuits or application specific integrated circuits (ASICs) and controls the charging unit 5 to charge the battery 6 when the mains supply of, for example, 230 V/50 Hz is applied to the input terminals L, N and to supply a voltage from the battery 6 to the DC/DC converter 4 when the power supply fails.

Figure 2A:
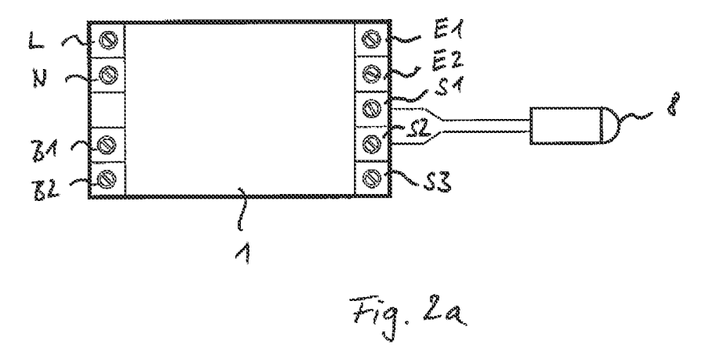
FIG. 2a to FIG. 2c show the converter unit shown in FIG. 1 in a first configuration, a second configuration and a third configuration, respectively.
Figure 2B:
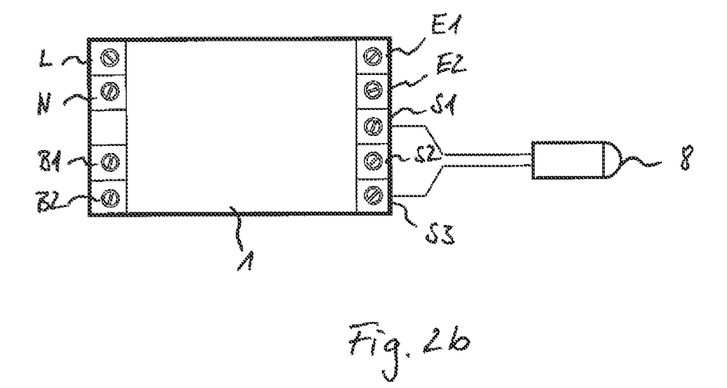
Figure 2C:
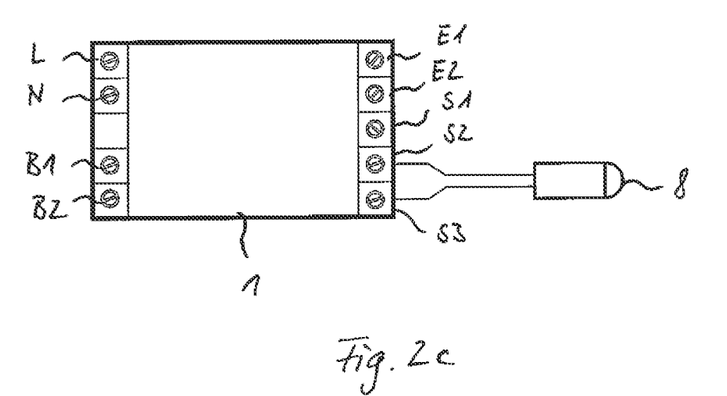

A current operational state of the emergency lighting converter unit 1 is signalled by the controlling means 7 using a status indicator light 8 connected to the converter unit 1 as shown in FIG. 2a to FIG. 2c.

The status indicator light 8 is mounted such that it is visible from the outside of an emergency luminaire housing and is a light emitting diode (LED), that indicates the charge process by blinking and a full battery by permanently emitting light. Alternatively, the status indicator light 8 can indicate power failure (emergency light mode) or malfunction of the emergency converter unit. The emergency luminaire comprises at least the converter unit 1, the status indicator light 8, the illuminant 2 and the battery 6.

According to the present invention, a t least one charging parameter and/or charging mode are selected by connecting the two poles of status indicator light 8 to two of the terminals S1 . . . S3, wherein a first charging current of a constant current charging mode is assigned to a first connection variant shown in FIG. 2a, in which the status indicator light 8 is connected to the terminals S1 and S2, a second charging current of a constant current charging mode is assigned to a second connection variant shown in FIG. 2b, in which the status indicator light 8 is connected to the terminals S1 and S3, and a pulse current charging mode is assigned to a third connection variant, in which the status indicator light 8 is connected to the terminals S2 and S3.

The status indicator light 8 is selectively connected to two of the terminals S1 . . . S3 by the manufacturer or the user in order to adapt the charging process to the type of the battery 6 connected to terminals B1, B2. The controlling means 7 stores the charging current and the charging mode to each connection variant, determines, preferably after the mains supply is applied to the input terminals L, N and before the charging process is started, the connection variant by detecting a load or a predetermined resistor between the terminals S1 and S2; S1 and S3; and S2 and S3, and sets the charging current and the charging mode depended on the determined connection variant. Further, based on the determined connection variant, the controlling means 7 outputs a signal/voltage to the terminals S1 and S2; S1 and S3; or S2 and S3 to drive the status indicator light 8 to indicate the charge process or a full battery as described above during normal operation.

Figure 3A:
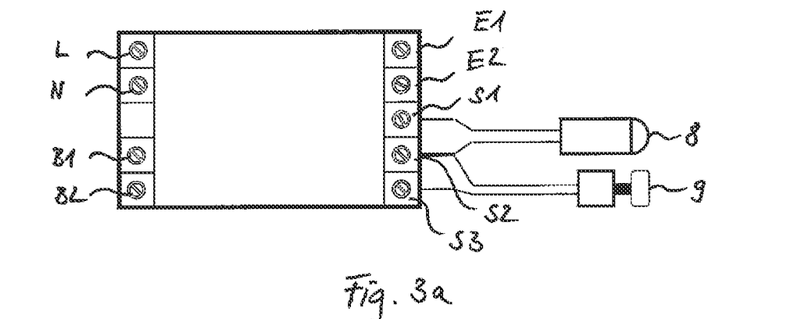
FIG. 3a to FIG. 3c show the converter unit shown in FIG. 1 in a fourth configuration, a fifth configuration and a sixth configuration, respectively.
Figure 3B:
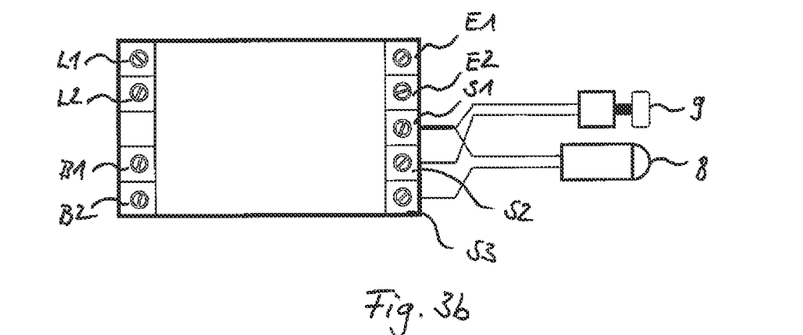
Figure 3C:
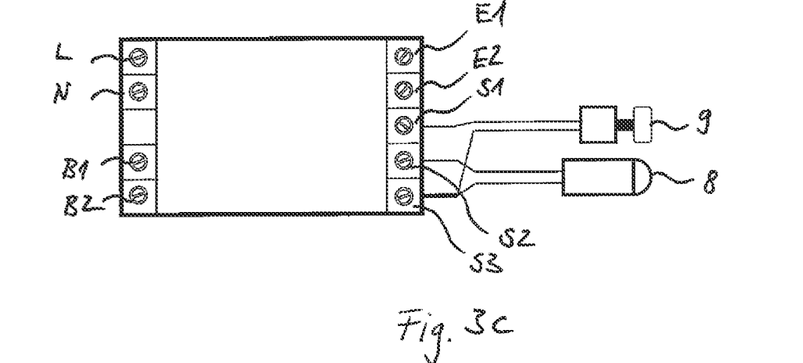

The remaining terminal S3 in FIG. 2a, S2 in FIG. 2b and/or S1 in FIG. 2c can be used to connect a switch 9 to the converter unit 1 as shown in FIG. 3a to FIG. 3c, wherein one pole of the switch 9 is connected to an unoccupied terminal and the other pole is connected to a terminal, to which one pole of the status indicator light 8 is connected.

The switch 9 is a pushbutton (normally open contact) operable by the user and the controlling means 7 detects whether a short circuit is applied between the unoccupied terminal and any other terminal and switches, when the short circuit is applied, from maintained mode to non-maintained mode, when the maintained mode is preset, or from the non-maintained to the maintained mode, when the non-maintained mode is preset. In the non-maintained mode, the illuminant 2 (lamp) is only supplied with energy by the DC/DC converter 4 when the power supply to the input terminals L, N fails. The switch 9 is mounted such that it is operable from the outside of an emergency luminaire housing.

In FIG. 3*a*, the switch 9 is connected in parallel to the terminals S2 and S3, in FIG. 3*b*, the switch 9 is connected in parallel to the terminals S1 and S2, and in FIG. 3*c*, the switch 9 is connected in parallel to the terminals S1 and S3.

Alternatively or in addition, a switch (normally open contact), with which the user starts the test mode, can be connected in parallel to the status indicator light 8, wherein the controlling means 7 detects whether a short circuit is applied between the terminals S1 . . . S3, to which the status indicator light 8 is connected and start the test mode, in which a power failure is simulated and the illuminant 2 is supplied, for a predetermined time (battery discharge duration), with a predetermined drive current using the battery 6, when the short circuit is detected.

Figure 4:
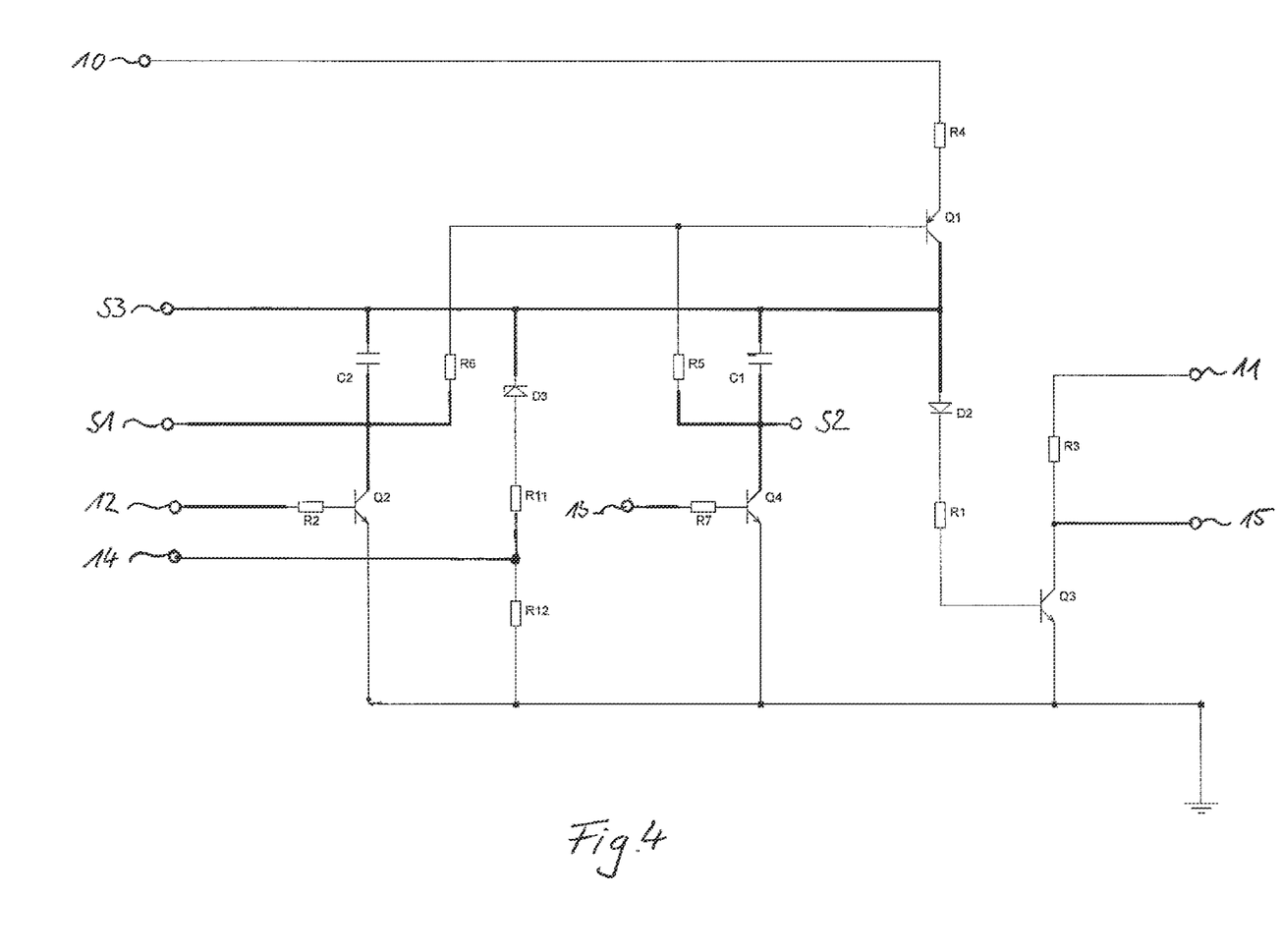
FIG. 4 shows a circuit for detecting one of two connection variants of the status indicator light.

The detection can be performed by a microcontroller of the controlling means 7 or by a discrete circuit of the controlling means 7. FIG. 4 shows an example of a detection circuit of the controlling means 7, with which a short circuit connected in parallel to the status indicator light 8 and the connection of the status indicator light 8 connected to the terminals S1 and S3 or S2 and S3 can be detected.

In FIG. 4, a first and second supply voltage is applied to the terminals 10 and 11, respectively, and a first signal for detecting whether the status indicator light 8 is connected to the terminals S1 and S3 is applied to terminal 12 or a second signal for detecting whether the status indicator light 8 is connected to the terminals S2 and S3 is applied to terminal 13. With the first signal applied from, for example, a microcontroller of the controlling means 7, to the terminal 12, the transistors Q2, Q1 and Q3 are switched on, the transistor Q4 is switched off and, when the status indicator light 8 is not connected to the terminals S1 and S3, a Zener diode D3 is conducting, a current flow through the Zener diode D3 and resistors R11, R12 and a voltage drop across the resistor R12 is detected at terminal 14 by the microcontroller. On the other hand, when the status indicator light 8 is connected to the terminals S1 and S3, the diode D3 is not conducting and the voltage drop across the resistor R12 becomes zero. Further, when a switch connected in parallel to the status indicator light 8 is operated by the user so that a short circuit is applied between the terminals S1 and S3, the transistor Q3 is switched off and the signal detected at terminal 15 by the microcontroller is switched from low to high voltage level.

With the second signal applied to the terminal 12, the transistors Q4, Q1 and Q3 are switched on, the transistors Q2 is switched off and, when the status indicator light 8 is not connected to the terminals S2 and S3, the diode D3 is conducting, the current flow through the diode D3 and the resistors R11, R12 and the voltage drop across the resistor R12 is detected at terminal 14 by the microcontroller. On the other hand, when the status indicator light 8 is connected to the terminals S1 and S3, the diode D3 is not conducting and the voltage drop across the resistor R12 becomes zero.

Further, when the switch connected in parallel to the status indicator light 8 is operated by the user so that a short circuit is applied between the terminals S2 and S3, the transistor Q3 is switched off and the signal detected at the terminal 15 by the microcontroller is switched from low to high voltage level. The signals outputted by the terminals 14 and 15 are evaluated by the microcontroller to control the charging process and to start the test mode, respectively.

In FIG. 2*a* to FIG. 2*c* and FIG. 3*a* to FIG. 3*c*, the user connects the connecting wires of the status indicator light 8 and the connecting wires of the switch 9 to the terminals S1 . . . S3, which can be screw terminals or spring clips.

Alternatively, the status indicator light 8 and the switch 9 can be connected by one of three adapters, wherein each adapter has three pins for connecting the terminals S1 . . . S3 on one side of the adapter and four terminals for connecting the two connecting wires of the switch 9 and the two connecting wires of the status indicator light 8 on another side of the adapter. In the adapter, the four terminals are connected to the three pins in accordance with the first connection variant shown in FIG. 3*a*, the second connection variant shown in FIG. 3*b* or the third connection variant shown in FIG. 3*c*. Further, terminals for a second switch can be provided on the other side and the adapter can be configured to connect the second switch in parallel to the status indicator light 8 as described above. With the adapter, it be possible to prevent incorrect connection, wherein the correct adapter is recommended by the manufacturer or sold with the battery 6.

Alternatively, a single adapter can provide the tree connection variants by DIP switches built into the adapter, wherein the DIP switches are operated by the user to connect the pins and the four or more terminals to establish one of three connection variants.

The number of selectable charging parameters and/or charging modes can be increased by using a light emitting diode (LED) as the two-pole status indicator light, wherein the controlling means then is configured to detect a polarity of the connected light emitting diode and to which of the terminals S1 and S2; S1 and S3; and S2 and S3 the light emitting diode is connected and is configured to set the charging parameter and/or the charging mode based on a table, which indicates a charging parameter and/or a charging mode to each combination of polarity and connection variant. The polarity can be also changed/set by the DIP switches.

Figure 5:
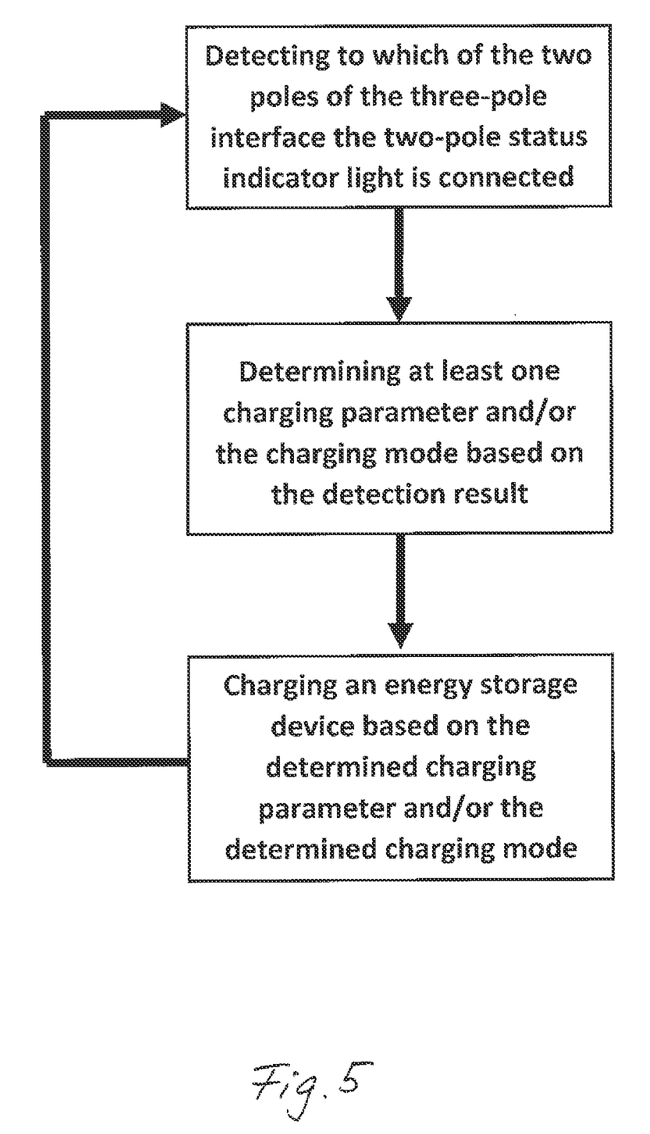
FIG. 5 shows a flowchart of the method according to an embodiment of the present invention.

FIG. 5 shows a very simplistic flowchart showing the single steps performed by the method described in detail above.

The invention claimed is:

1. A converter unit for providing a supply current to a load device (2) using an energy storage device (6), the converter unit (1) comprising
    a controlling means (7) configured to set at least one charging parameter and/or a charging mode, and to control the process of charging the energy storage device (6) based on the set charging parameter and/or the set charging mode; and
    at least a first terminal (S1), a second terminal (S2) and a third terminal (S3) for electrically connecting a two-pole status indicator light (8), wherein
    the controlling means (7) is configured to detect to which of the first terminal (S1), the second terminal (S2) and the third terminal (S3) the two-pole status indicator light (8) is connected and is configured to set the at least one charging parameter and/or the charging mode based on the detection result.

2. The converter unit according to claim 1, wherein the controlling means (7) is configured to differentiate between at least two connection options for connecting the two-pole status indicator light (8) to two of the first terminal (S1), the second terminal (S2) and the third terminal (S3), and is configured to set the at least one charging parameter and/or the charging mode based on an assignment/table that assigns a predetermined charging parameter and/or a predetermined charging mode to each of the two connection options.

3. The converter unit according to claim 1, wherein
the first terminal (S1), the second terminal (S2) and the third terminal (S3) are configured to connect a light emitting diode as the two-pole status indicator light (8); and
the controlling means (7) is configured to detect a polarity of the connected light emitting diode and to set the at least one charging parameter and/or the charging mode also based on the detected polarity.

4. The converter unit according to claim 1, wherein the controlling means (7) is configured to detect whether a short circuit is applied between the first terminal (S1) and the second terminal (S2), between the first terminal (S1) and the third terminal (S3) and/or between the second terminal (S2) and the third terminal (S3).

5. The converter unit according to claim 4, wherein the controlling means (7) is configured to start a test mode, to switch between maintained mode and non-maintained mode, to switch between a first battery discharge duration and a second battery discharge duration, or to start a charging process of the energy storage device, when the short circuit is applied.

6. The converter unit according to claim 4, wherein the controlling means (7) is configured to detected whether a first short circuit is applied between the first terminal (S1) and the second terminal (S2), whether a second short circuit is applied between the first terminal (S1) and the third terminal (S3) and whether a third short circuit is applied between the second terminal (S2) and the third terminal (S3), and to set a first battery discharge duration, when the first short circuit is applied, to set a second battery discharge duration, when the second short circuit is applied and to set a third battery discharge duration, when the third short circuit is applied.

7. The converter unit according to claim 1, wherein the at least one charging parameter is a value of a charging current.

8. The converter unit according to claim 1, wherein the controlling means (7) is configured to set at least one of a constant charging and pulse charging as the charging mode.

9. An emergency light comprising a converter unit according to claim 1, the two-pole status indicator light (8) and a lamp as said load device (2).

10. A method for setting at least one charging parameter and/or a charging mode of a converter unit (1) for charging an energy storage device (6), wherein the converter unit (1) comprises a three-pole interface (S1, S2, S3) for connecting a two-pole status indicator light (8), the method comprising steps of:
detecting to which of the two poles of the three-pole interface (S1, S2, S3) the two-pole status indicator light (8) is connected; and
setting the at least one charging parameter and/or the charging mode based on the detection result.

* * * * *